UNITED STATES PATENT OFFICE.

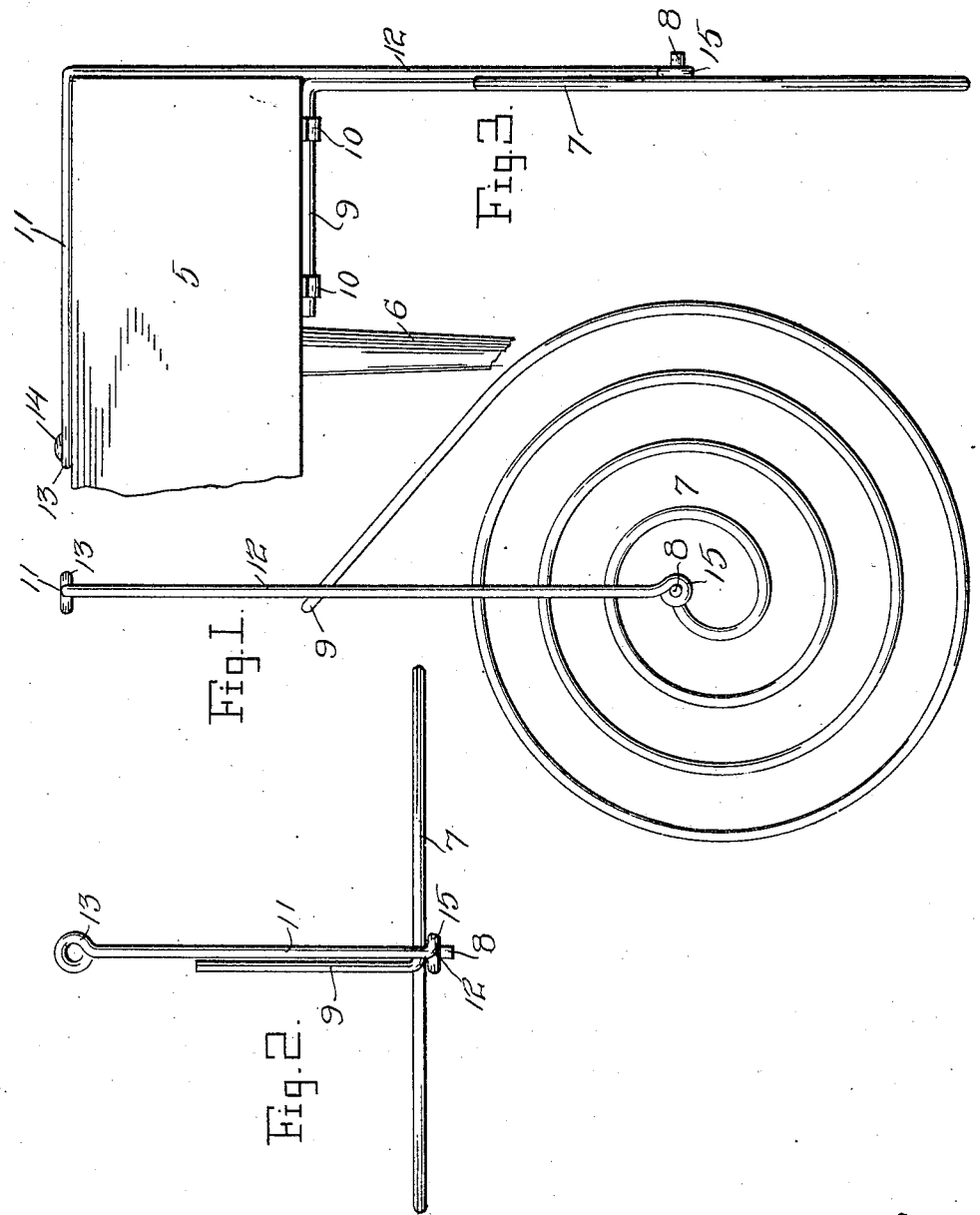

JOSEPH C. HANKA, OF AMETHYST, COLORADO.

HAY-RAKE.

No. 852,433.     Specification of Letters Patent.     Patented May 7, 1907.

Application filed September 27, 1906. Serial No. 336,480.

*To all whom it may concern:*

Be it known that I, JOSEPH C. HANKA, a citizen of the United States, residing at Amethyst, in the county of Mineral, State of Colorado, have invented certain new and useful Improvements in Hay-Rakes; and I do hereby declare the following to be a full, clear, and exact description of the invention, such as will enable others skilled in the art to which it appertains to make and use the same.

This invention relates to hay rakes and is particularly an attachment for hay rakes for the purpose of preventing passing of hay while the rake is in use, and being a well known fact that hay will pass around the ends of the rake and be lost. I obtain this object by providing a resilient spiral guard which is mounted upon the rake head at each end thereof and which prevents the hay from passing around the ends of the rake.

In the accompanying drawings—Figure 1 is a side elevation of the guard detached from the rake. Fig. 2 is a plan view of the guard detached. Fig. 3 is an edge view of the guard showing the manner of mounting the same at the end of the rake head.

Referring most specifically to the drawings the numeral 5 denotes a rake head and 6 teeth which may be of any desired construction and may be secured to the head in any suitable manner.

The guard involving my invention is formed of a resilient rod which is bent in a spiral form as indicated by the numeral 7 and has its end at the center of the spiral bent laterally at right angles as at 8 and its opposite end, which is located at the spiral, bent laterally at right angles as at 9 and in opposite operation to the end 8. The convolutions of the spiral lie in a common plane and the laterally bent ends 8 and 9 of the guard hence extend from the opposite sides of the same.

The laterally bent portion 9 of the spiral guard member above described is secured to the slide of the rake head 5 by means of suitable clips 10 to aid in firmly supporting the guard member upon the rake head, and to prevent bulging of the convolutions of the spiral due to the pressure or weight of the hay, I provide a suitable bracket which comprises a rod having right angularly bent portions 11 and 12 the portion 11 being provided with an eye 13 by means of which the bracket member may be secured upon the rake head 5, there being a bolt 14 engaged through the said eye member and the rake head for this purpose. The lower end of the arm 12 is also provided with an eye member 15 through which the laterally turned portion 8 of the guard member is engaged.

From the foregoing it will be readily understood that the guard embodying my invention may be applied to any ordinary form of rake and that owing to the fact that it is formed of a spirally bent resilient rod, it will yield to an efficient degree in passing over rough ground.

What is claimed is:—

1. In a device of the class described, the combination with a rake head, of a spiral guard member supported at each end of the rake head, and means for preventing bulging of the convolutions of the guard.

2. In a device of the class described the combination with a rake head, of a spiral resilient guard member supported at each end of the rake head, and means for preventing bulging of the convolutions of the spiral.

In testimony whereof, I affix my signature, in presence of two witnesses.

JOSEPH C. HANKA.

Witnesses:
    DAN. W. SAWARD,
    J. R. PINCKLEY.